Nov. 5, 1957
E. V. WYATT, JR
2,812,152
HYDRAULIC WATER TIMER
Filed Dec. 1, 1955
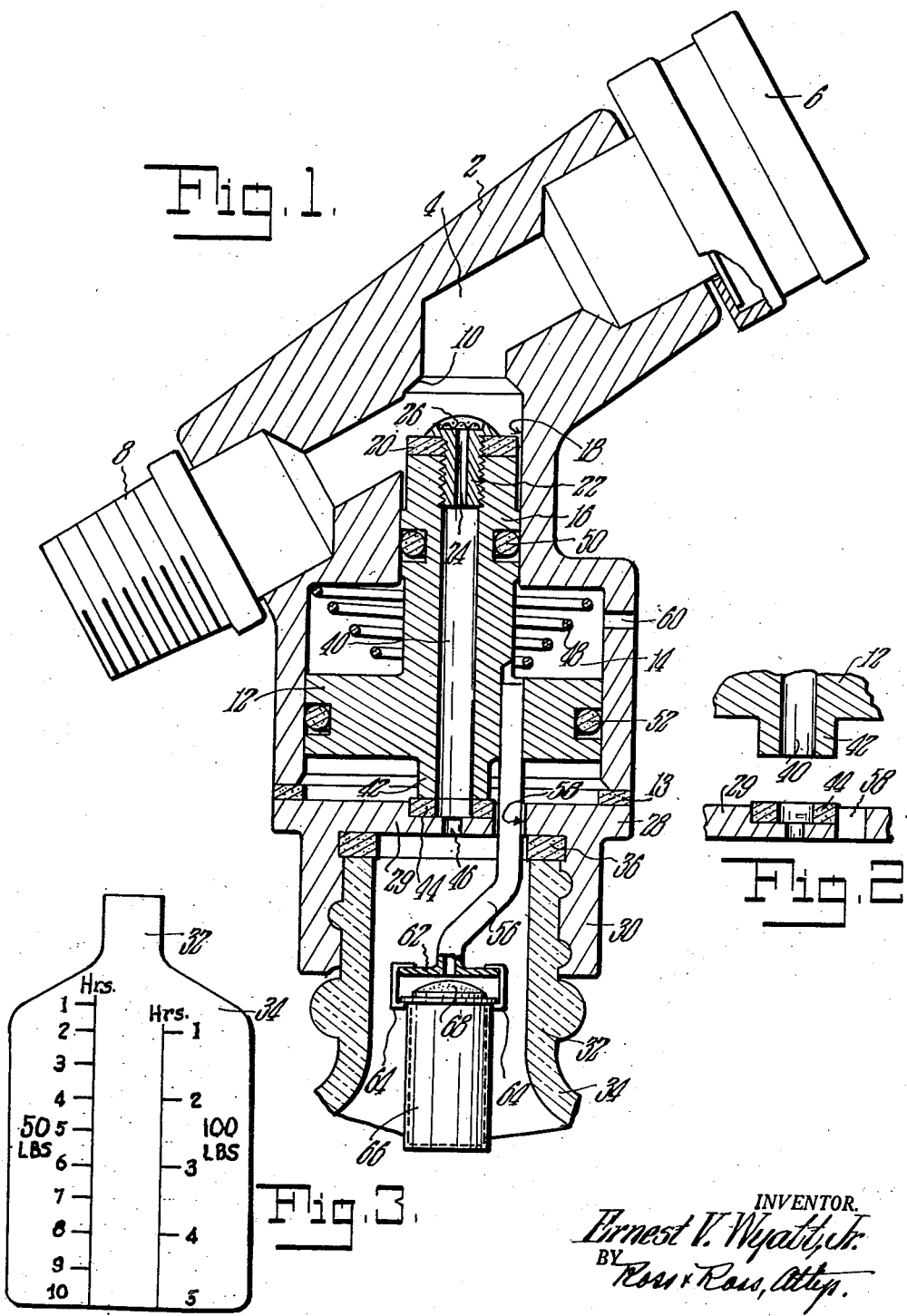
INVENTOR.
Ernest V. Wyatt, Jr.
BY Ross & Ross, Attys.

United States Patent Office 2,812,152
Patented Nov. 5, 1957

2,812,152
HYDRAULIC WATER TIMER
Ernest Vincent Wyatt, Jr., Hartford, Conn.

Application December 1, 1955, Serial No. 550,372

5 Claims. (Cl. 251—22)

This invention relates to improvements in valve apparatus and is directed to valve apparatus for controlling the flow of liquids, such as water, in time cycles.

The principal object of the invention is the provision of valve apparatus for use in a water line to cut off the flow of water at the end of a predetermined lapse of time.

The apparatus is adapted for various uses but the novel features thereof will, for purposes of description, be disclosed in connection with hose as used for watering lawns, gardens, etc.

In watering gardens and lawns, it is desired that the watering operation continue for a certain length of time, but this necessitates the user determining the time from a timepiece.

Other prime objects of my invention include; first, the securement of a higher degree of accuracy and greater degree of variety in the manner of work performed therewith than has heretofore been possible with prior devices known in the art; second, the attainment of a higher speed of construction and assembly of the device due to its simplification of design and its unique composition of parts; third, the attainment of a flexibility or a capability of adjustment by which a large variety of work can be produced by means of the same device; fourth, the achievement of a greater case in adjustment and repairs; fifth, the provision of an improved valve apparatus which may be made more economically and with fewer operations in the manufacture of its parts, as well as in the assembly of the same, than prior devices known in the art; sixth, the provision of a construction which may be readily installed with respect to the various purposes for which it is intended; and seventh, the provision of such other improvements in and relating to valve apparatus of the type above referred to as are hereinafter described and claimed.

The apparatus of this invention is constructed and arranged to cut off water flow when the desired time has elapsed whereby the hose nozzle or sprinkler may be unattended during the time cycle.

Further objects and advantages of my invention will become apparent as the following description proceeds, and the features of novelty which characterize my invention will be pointed out with particularity in the claims annexed to and forming part of this specification.

In the accompanying drawing, I have illustrated a complete example of a physical embodiment of the invention in which the parts are combined and arranged in accordance with one mode which I have devised for the practical application of the principles of the invention. It will however be understood that changes and alterations are contemplated and may be made in these exemplifying drawings and mechanical structures, within the scope of the claims, without departing from the principles of the invention.

The above cited objects, I accomplish by means of such structure and relative arrangement of parts thereof, as will fully appear by a perusal of the description below and by various specific features which will be hereinafter set forth.

To these ends, various other and ancillary features and advantages and objects of my invention will become more readily apparent as the description proceeds. My invention consists in certain features of novelty, in a mode of operation, and in the combination, organization, and arrangement of parts as will be hereinafter more particularly pointed out in the claims hereunto annexed and more fully described and referred to in conjunction with the accompanying drawings where:

Fig. 1 is a sectional elevational view through valve apparatus embodying the novel features of the invention;

Fig. 2 is a fragmentary sectional view through the lower valve of the apparatus; and Fig. 3 is a diagrammatic elevational view of the container of the apparatus.

In the following description and claims, various details will be identified by specific names for convenience. These names however are intended to be as generic in their application as the art will permit.

Referring now to the drawing more in detail, in which similar characters of reference indicate corresponding parts in the several figures and referring more particularly to the preferred form of my invention selected for illustrative purposes, I have shown a body which is represented by 2 and which has a waterway 4 and female and male couplings 6 and 8 secured in opposite ends of the waterway. A hose will connect the coupling 6 to the water supply and a hose connected to coupling 8 will discharge water to a nozzle, sprinkler or the like.

A valve seat 10 is provided in the waterway. A piston 12 is reciprocable in a lower bore 14 of the body 2 and has a plug portion 16 extending upwardly from the upper side thereof which is reciprocable in a relatively smaller bore 18 provided in the body.

A valve 20 is secured to the upper end of the plug 16 by means of a screw 22 threaded in the plug. Said valve is relatively yieldable and the screw is provided with an axial passageway 24 and with a screen or filter 26 thereover, as shown.

The piston 12 is shown in its lower open position of the valve. In its upper closed position of the valve said valve 20 engages seat 10 to close off the waterway.

A lower cap 28 is provided which is secured to the lower end of the body in any convenient manner as by screws or the like. A packing 13 is disposed between the body and cap, as shown.

The cap 28 is for all purposes, a part of the body and is provided with an open neck 30 which is adapted to receive and secure the upper threaded neck 32 of a container such as a bottle 34. To provide a tight joint a packing 36 is provided.

The piston 12 is provided with an axial bore 40 and a lower valve part 42 at its lower end for engaging a seat 44 of wall 29 of the cap 28 in lower position of the piston 12. The seat 44 has an opening therethrough, as shown. Wall 29 closes the lower end of piston bore 14. Said wall is provided with a passageway 46 which is in register with the bore 40. In the lower position of the piston, open position of the upper valve 20 and closed position of lower valve 42, the passageways 24, 40 and 46 are connected to function as a by-pass for water from the waterway to the bottle. The areas of the passageway 24, 40 and 46 may be varied as desired for the intended functioning of the apparatus.

A spring 48 urges the piston 14 to its lower position and rings 50 and 52 of ordinary form are provided around the plug 16 and its piston 12.

A vent tube 56 has an upper end fixed in the piston 12 and extends downwardly therefrom and loosely through an opening 58 of the wall 29 of the cap so that its lower end is disposed within the neck of the container or bottle. The body is provided with a vent port 16.

The lower end of vent tube is provided with a float operated valve which may take any form desired.

As shown a disc 62 fixed on the end of tube 56 has retainers 64 depending therefrom which rather loosely support a float 66 having a valve 68 on the upper end thereof. The valve is shown in open position.

With the inlet 6 connected to the water supply and the parts in the position shown, a small amount is by-passed through 24, 40 and 46 into the bottle. Air in the bottle displaced by water is vented through vent tube 56 and vent port 60.

When the level of water in the bottle elevates float 66 so as to close off the vent means pressure within the bottle increases and entrapped air and/or water passing through opening 58 around tube acts on to elevate piston 12. Slight upward movement of the piston 12 unseats valve 42 whereby water from bore 40 quickly acts on the underside of piston 12, which is of considerable area, and elevates it to bring valve 20 against seat 10. Thus flow through the waterway is cut off. The parts are so arranged that the cut off action is very rapid following operation of the float valve mechanism.

The valve will operate to close off the waterway when the bottle is filled to bring about action of the float. The elapsed time during which the valve remains open depends of course on the area of passageways, water pressure, capacity of bottle and other factors.

According to the invention the apparatus is arranged to allow the flow of water for various time cycles and is accomplished by calibrating the bottle for various water pressures of various locations.

As one example it will be assumed that it is desired that the apparatus operate to cut off water at intervals of one hour for water pressure of fifty pounds.

With the parts in the position shown and water flowing through the waterway and by-passed to the bottle the bottle is marked at the level of water at the end of each hour as shown adjacent the legend 50 lbs., all as shown in Fig. 3.

Assume it is desired to cut off water at the end of two hours. The bottle is disconnected from the body and filled up to the 2 hour line and connected to the body. When two hours have elapsed the water will actuate the float for operation of the piston and cut off valve.

The bottle may be calibrated for one hundred pounds pressure, as shown, or for pressures likely to be encountered in various locations. The divisions for time may be for hours or divisions thereof or for multiple hours.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description and all modifications and variations as fall within the meaning and purview and range of equivalency of the appended claims are therefore intended to be embraced therein.

What it is desired to claim and secure by Letters Patent of the United States is:

1. Apparatus for timing the flow of water comprising in combination, a body including a waterway having opposite inlet and outlet ends and an upper plug bore extending from said waterway to a lower piston bore aligned therewith and a chamber separated from the lower end of said piston bore by a transverse wall, a container having an open inlet connected to said chamber, a piston and a plug integral therewith reciprocable in said piston and plug bores between lower open and upper closed positions, said body having a valve seat in said waterway in alignment with said plug bore, said plug having a cut-off valve engageable with the valve seat in upper closed position of the piston and plug to close said waterway, said wall having a passageway below the piston from the piston bore to the chamber, said cut-off valve and plug and piston having a by-pass passageway registrable with said passageway in lower open position of the piston only for by-passing water from the waterway to the chamber and into the container, said wall provided with an opening from the chamber to the piston bore below the piston open in all positions thereof, vent means from the chamber upwardly past the piston and into the piston bore and a normally open vent port provided in the body from the piston bore and above the piston for venting air from the chamber and container displaced by water in the container flowing from the by-pass, said vent port adapted to be closed by the piston in upper position thereof, normally open float-valve means in the chamber operable by the level of water in the container to close said vent means whereby pressure through said opening initially elevates said piston for the flow of pressure through said passageway to move said piston and plug upwardly for engaging said cut-off valve with the seat of the waterway to close said waterway, and means resisting movements of the piston from open position.

2. Apparatus for timing the flow of water set forth in claim 1 wherein the piston and piston bore are of relatively greater diameter than that of the plug and plug bore.

3. Apparatus for timing the flow of water set forth in claim 1 wherein said means resisting movements of the piston includes compression spring means in the piston bore above said piston.

4. Apparatus for timing the flow of water set forth in claim 1 wherein said vent means includes a tube having an upper end secured in said piston and depending into said chamber and being reciprocable relative to said wall.

5. Apparatus for timing the flow of water set forth in claim 1 wherein said vent means includes a tube having an upper end secured in said piston and depending therefrom into said chamber and being reciprocable relative to said wall and said float-valve means includes a float movable relative onto a seat at the lower end of said tube for closing said vent means.

References Cited in the file of this patent

UNITED STATES PATENTS

| | | |
|---|---|---|
| 318,899 | Haydn | May 26, 1885 |
| 802,330 | Schulze | Oct. 17, 1905 |